(12) United States Patent
Hirokane et al.

(10) Patent No.: US 9,902,852 B2
(45) Date of Patent: Feb. 27, 2018

(54) POLYESTER RESIN COMPOSITION

(71) Applicant: MITSUBISHI GAS CHEMICAL COMPANY, INC., Tokyo (JP)

(72) Inventors: Takeshi Hirokane, Kanagawa (JP); Atsuko Iwasaki, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/905,501

(22) PCT Filed: Jul. 25, 2014

(86) PCT No.: PCT/JP2014/069766
§ 371 (c)(1),
(2) Date: Jan. 15, 2016

(87) PCT Pub. No.: WO2015/019881
PCT Pub. Date: Feb. 12, 2015

(65) Prior Publication Data
US 2016/0168373 A1    Jun. 16, 2016

(30) Foreign Application Priority Data

Aug. 5, 2013   (JP) ................. 2013-162022

(51) Int. Cl.
*C08L 67/02*   (2006.01)
*C08G 63/189*   (2006.01)
*C08G 63/672*   (2006.01)

(52) U.S. Cl.
CPC ............ *C08L 67/02* (2013.01); *C08G 63/189* (2013.01); *C08G 63/672* (2013.01)

(58) Field of Classification Search
CPC ...... C08L 67/02; C08G 63/189; C08G 63/672
See application file for complete search history.

(56) References Cited

U.S. PATENT DOCUMENTS

2003/0195303 A1   10/2003   Ikeda et al.

FOREIGN PATENT DOCUMENTS

| | | |
|---|---|---|
| EP | 1 460 106 | 9/2004 |
| EP | 2 299 297 | 3/2011 |
| JP | 11-21435 | 1/1999 |
| JP | 2002-69165 | 3/2002 |
| JP | 2003-246922 | 9/2003 |
| JP | 2005-002237 | 1/2005 |
| JP | 2005-330355 | 12/2005 |
| JP | 2006-111718 | 4/2006 |
| JP | 2008-189809 | 8/2008 |
| JP | 2008-223038 | 9/2008 |

OTHER PUBLICATIONS

International Search Report issued in PCT/JP2014/069766 Patent Application No. , dated Oct. 14, 2014.
International Preliminary Examination Report in PCT/JP2014/069766 dated Feb. 9, 2016 with English Translation thereof.

*Primary Examiner* — Robert Jones, Jr.
(74) *Attorney, Agent, or Firm* — Greenblum & Bernstein, P.L.C.

(57) ABSTRACT

The polyester resin composition according to the present invention contains a polyester resin (A) containing, as a diol unit, a unit derived from diol having a cyclic acetal skeleton, and as a dicarboxylic acid unit, a unit derived from dicarboxylic acid having a naphthalene skeleton, and a polyester resin (B) not having a cyclic acetal skeleton; and satisfies following (1) and (2):
(1) a refractive index difference between the polyester resin (A) and the polyester resin (B) is 0.005 or less, the refractive index being measured with sodium D radiation as a light source;
(2) a glass transition temperature difference between the polyester resin (A) and the polyester resin (B) is 35° C. or less.

13 Claims, No Drawings

POLYESTER RESIN COMPOSITION

TECHNICAL FIELD

The present invention relates to a polyester resin composition comprising: a polyester resin (A) comprising, as a diol unit, a unit derived from diol having a cyclic acetal skeleton, and as a dicarboxylic acid unit, a unit derived from dicarboxylic acid having a naphthalene skeleton; and a polyester resin (B) not having a cyclic acetal skeleton, the polyester resin composition having excellent transparency even after stretched.

BACKGROUND ART

Polyethylene terephthalate (hereinafter referred to as "PET") is a resin well balanced in transparency, mechanical performance, solvent resistance, scent retaining properties, weather resistance, recyclability, and the like. Thus, PET is used for bottles, films, and the like. However, PET has the following drawbacks on heat resistance. More specifically, PET has a glass transition temperature of about 80° C. and hence cannot be used for the purpose where high heat resistance is demanded such as containers required sterilization or disinfection, heat resistant transparent cups for beverage, containers required reheating, or packaging materials for export products that are to cross the equator. Also, for UV barrier properties, PET transmits light at a wavelength of about 350 nm and thus the resin itself substantially has no UV barrier properties.

For this reason, polyethylene naphthalate (hereinafter referred to as "PEN") has been often used in the fields where heat resistance is required.

Further, for the fields where UV barrier properties are required, PEN has been similarly used and the addition of a UV absorber to PET has been studied.

However, PEN is an expensive resin and hence has limited purpose of use. The blending of PET and PEN has been studied as a counter measurement but the refractive index (nd) of PET and PEN is 1.575 and 1.646, respectively, causing the refractive index difference to be as large as 0.071, whereby it was difficult to obtain a composition having excellent transparency from PET and PEN. Various methods for obtaining a transparent composition from PET and PEN have been studied, and proposals include a method for melt-kneading these resins in advance under predetermined conditions and the use of an extruder with extremely long residence time and good kneadability (e.g., see Patent Literature 1).

Further, Patent Literature 2 discloses a polyester resin modified with 3,9-bis(1,1-dimethyl-2-hydroxyethyl)-2,4,8,10-tetraoxaspiro[5.5]undecane and having excellent mechanical performance and moldability. Furthermore, a polyester resin composition containing the above polyester resin and other polyester resins and having excellent transparency, low crystallinity, melt viscoelasticity, heat resistance, and fabricability is proposed (e.g., see Patent Literatures 3 and 4).

CITATION LIST

Patent Literature

Patent Literature 1: Japanese Patent Laid-Open No. 11-21435

Patent Literature 2: Japanese Patent Laid-Open No. 2002-69165

Patent Literature 3: Japanese Patent Laid-Open No. 2003-246922

Patent Literature 4: Japanese Patent Laid-Open No. 2008-189809

SUMMARY OF INVENTION

Technical Problem

However, the method for melt-kneading PET and PEN under predetermined conditions in advance and the method described in Patent Literature 1, both of which have been known as the methods for obtaining a transparent composition from PET and PEN, have the limitation on the shape of screws, temperature, the number of screw rotation, and productivity, hence being poor for wide applicability. The polyester resin composition, which does not require such a specific melt-kneading method, has excellent heat resistance and is capable of easily achieving transparency, is not known.

On the other hand, the technique by which a UV absorber is added to PET for imparting the UV barrier properties poses problems in that, due to a UV absorber, the metal mold of an injection molding machine gets dirty, the roll of an extruder gets dirty, and the resin suffers from significant coloring at the time of molding.

Further, the polyester resin composition disclosed in Patent Literature 3 sometimes has poor transparency, or requires intense melt-kneading to achieve transparency. Furthermore, when the polyester resin composition disclosed in Patent Literature 4 is stretched, the haze value of the polyester resin composition is increased and sometimes affecting the transparency, which results in limiting the purpose of application.

The present invention has been made in view of the problems posed by the above prior art, and has an object to provide a polyester resin composition, which has excellent heat resistance, transparency, UV barrier properties, and fabricability, in particular, exhibits excellent transparency even after stretched. Further, an object of the present invention is to provide a secondary processed molded article using such a polyester resin composition.

Solution to Problem

As a result of conducting diligent studies, the present inventors have found that the polyester resin composition containing a polyester resin containing a unit derived from diol having a cyclic acetal skeleton and a unit derived from dicarboxylic acid having a naphthalene skeleton, and a polyester resin not having a cyclic acetal skeleton, wherein these polyester resins have a refractive index difference and a glass transition temperature difference of a certain value or less, has excellent heat resistance, transparency, UV barrier properties and fabricability. On the basis of these findings, the present invention has been completed.

More specifically, the present invention is as follows.

[1]

A polyester resin composition comprising:

a polyester resin (A) comprising, as a diol unit, a unit derived from diol having a cyclic acetal skeleton, and as a dicarboxylic acid unit, a unit derived from dicarboxylic acid having a naphthalene skeleton; and a polyester resin (B) not having a cyclic acetal skeleton, and wherein the polyester resin composition satisfies following (1) and (2)

(1) a refractive index difference between the polyester resin (A) and the polyester resin (B) is 0.005 or less, the refractive index being measured with sodium D radiation as a light source;

(2) a glass transition temperature difference between the polyester resin (A) and the polyester resin (B) is 35° C. or less.

[2]

The polyester resin composition according to [1], wherein, in the polyester resin (A), a ratio of the unit derived from diol having a cyclic acetal skeleton in the diol unit is 1 to 80 mol %, and a ratio of the unit derived from dicarboxylic acid having a naphthalene skeleton in the dicarboxylic acid unit is 1 to 100 mol %.

[3]

The polyester resin composition according to [1] or [2], wherein, in the polyester resin composition, a ratio of the unit derived from diol having a cyclic acetal skeleton in an entire diol unit is 0.05 to 2.0 mol %, and a ratio of the unit derived from dicarboxylic acid having a naphthalene skeleton in an entire dicarboxylic acid unit is 0.1 to 3.0 mol %.

[4]

The polyester resin composition according to any one of [1] to [3], wherein the unit derived from diol having a cyclic acetal skeleton in the polyester resin (A) is a unit derived from diol represented by general formula (1) or general formula (2):

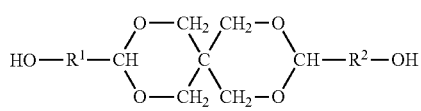

(1)

(wherein $R^1$ and $R^2$ are, each independently, a divalent hydrocarbon group selected from the group consisting of aliphatic hydrocarbon groups having 1 to 10 carbon atoms, cycloaliphatic hydrocarbon groups having 3 to 10 carbon atoms, and aromatic hydrocarbon groups having 6 to 10 carbon atoms);

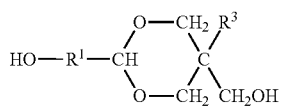

(2)

(wherein $R^1$ is the same as defined above, and $R^3$ is a divalent hydrocarbon group selected from the group consisting of aliphatic hydrocarbon groups having 1 to 10 carbon atoms, cycloaliphatic hydrocarbon groups having 3 to 10 carbon atoms, and aromatic hydrocarbon groups having 6 to 10 carbon atoms.)

[5]

The polyester resin composition according to any one of [1] to [3], wherein the unit derived from diol having a cyclic acetal skeleton in the polyester resin (A) is a unit derived from 3,9-bis(1,1-dimethyl-2-hydroxyethyl)-2,4,8,10-tetraoxaspiro[5.5]undecane, or 5-methylol-5-ethyl-2-(1,1-dimethyl-2-hydroxyethyl)-1,3-dioxane.

[6]

The polyester resin composition according to any one of [1] to [5], wherein the unit derived from dicarboxylic acid having a naphthalene skeleton in the polyester resin (A) is a unit derived from at least one dicarboxylic acid selected from the group consisting of 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid.

[7]

The polyester resin composition according to any one of [1] to [5], wherein the unit derived from dicarboxylic acid having a naphthalene skeleton in the polyester resin (A) is a unit derived from 2,6-naphthalenedicarboxylic acid.

[8]

The polyester resin composition according to any one of [1] to [7], wherein the polyester resin (B) is polyethylene terephthalate.

[9]

The polyester resin composition according to any one of [1] to [8], wherein a light transmittance at a wavelength of 350 nm is 30%/200 μm or less.

[10]

A polyester secondary processed molded article obtained by stretching the polyester resin composition according to any one of [1] to [9].

[11]

The polyester secondary processed molded article according to [10], which has a haze value of 5%/20 μm or less, the haze value being measured in accordance with JIS-K-7105.

Advantageous Effects of Invention

The polyester resin composition according to the present invention has excellent heat resistance, transparency, UV barrier properties, and fabricability, in particular, exhibits excellent transparency even after stretched.

DESCRIPTION OF EMBODIMENTS

Hereinafter, the embodiments to carry out the present invention (hereinafter simply referred to as "present embodiment") are described in detail. The following present embodiments are examples to illustrate the present invention and not intended to limit the present invention thereto. The present invention can be carried out in suitable modification within the gist thereof.

The polyester resin composition (C) of the present embodiment comprises a polyester resin (A) comprising, as a diol unit, a unit derived from diol having a cyclic acetal skeleton and as a dicarboxylic acid unit, a unit derived from dicarboxylic acid having a naphthalene skeleton, and a polyester resin (B) not having a cyclic acetal skeleton. Further, the polyester resin composition (C) of the present embodiment satisfies the following (1) to (2):

(1) a refractive index difference between the polyester resin (A) and polyester resin (B) is 0.005 or less, the refractive index being measured with the sodium D radiation as a light source;

(2) a glass transition temperature difference between the polyester resin (A) and the polyester resin (B) is 35° C. or less.

The polyester resin composition (C) of the present embodiment is configured as described above, and thus has excellent heat resistance, transparency, UV barrier properties, and fabricability, in particular, exhibits excellent transparency even after stretched. More specifically, the polyester resin composition (C) of the present embodiment is suitable for the applications such as sheets, films, sheet molded articles, or hollow containers, hence being industrially significant.

First, the polyester resin (A) used for obtaining the polyester resin composition (C) of the present embodiment is described. The polyester resin (A) preferably contains, as a diol unit, from the viewpoint of imparting heat resistance, a unit derived from diol having a cyclic acetal skeleton represented by the following general formula (1) or general formula (2).

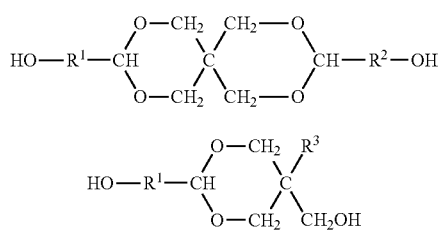

In general formulae (1) and (2), $R^1$ and $R^2$ are, each independently, a divalent hydrocarbon group selected from the group consisting of aliphatic hydrocarbon groups having 1 to 10 carbon atoms, cycloaliphatic hydrocarbon groups having 3 to 10 carbon atoms, and aromatic hydrocarbon groups having 6 to 10 carbon atoms. $R^1$ and $R^2$ are preferably a methylene group, an ethylene group, a propylene group, a butylene group, or structural isomers thereof. Examples of these structural isomers include, but not limited thereto, an isopropylene group and an isobutylene group. $R^3$ is a hydrocarbon group selected from the group consisting of aliphatic hydrocarbon groups having 1 to 10 carbon atoms, cycloaliphatic hydrocarbon groups having 3 to 10 carbon atoms, and aromatic hydrocarbon groups having 6 to 10 carbon atoms. $R^3$ is preferably a methyl group, an ethyl group, a propyl group, a butyl group, or structural isomers thereof. Examples of these structural isomers include, but not limited thereof, an isopropyl group and an isobutyl group. The compounds represented by the general formulae (1) and (2) may be used singly, or 2 or more may be used.

The compounds represented by the general formula (1) and (2) are particularly preferably, from the viewpoint of imparting heat resistance, 3,9-bis(1,1-dimethyl-2-hydroxyethyl)-2,4,8,10-tetraoxaspiro[5.5]undecane, and 5-methylol-5-ethyl-2-(1,1-dimethyl-2-hydroxyethyl)-1,3-dioxane.

The ratio of the unit derived from diol having a cyclic acetal skeleton in the polyester resin (A) is preferably 1 to 80 mol %, more preferably 4 to 60 mol %, further preferably 6 to 40 mol %, and particularly preferably 8 to 25 mol %, in the diol unit. When the unit derived from diol having a cyclic acetal skeleton is contained in the above ratio, a glass transition temperature of the polyester resin (A) increases and the polyester resin composition of the present embodiment is likely to have enhanced heat resistance, hence preferable.

The polyester resin (A) of the present embodiment may have a unit derived from diol which does not have a cyclic acetal skeleton. The ratio of the unit derived from diol which does not have a cyclic acetal skeleton is preferably 20 to 99 mol %. Examples of the unit derived from diol which does not have a cyclic acetal skeleton include, but not particularly limited to, diol-derived units such as aliphatic diols such as ethylene glycol, trimethylene glycol, 1,4-butanediol, 1,5-pentanediol, 1,6-hexanediol, diethylene glycol, and propylene glycol, neopentyl glycol; cyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralin dimethanol, norbornane dimethanol, tricyclodecane dimethanol, and pentacyclododecane dimethanol; polyether compounds such as polyethylene glycol, polypropylene glycol, and polybutylene glycol; bisphenols such as 4,4'-(1-methylethylidene) bisphenol, methylenebisphenol (bisphenol F), 4,4'-cyclohexylidene bisphenol (bisphenol Z), and 4,4'-sulfonylbisphenol (bisphenol S); alkylene oxide adducts of the above bisphenols; aromatic dihydroxy compounds such as hydroquinone, resorcin, 4,4'-dihydroxybiphenyl, 4,4'-dihydroxydiphenyl ether, 4,4'-dihydroxydiphenyl benzophenone; and alkylene oxide adducts of the above aromatic dihydroxy compounds. Considering the mechanical strength and heat resistance of the polyester resin (A), the units derived from ethylene glycol, trimethylene glycol, 1,4-butanediol, and 1,4-cyclohexanedimethanol are preferable, and the unit derived from ethylene glycol is more preferable. Note that the polyester resin (A) may contain one or two or more of the units derived from diol which does not have a cyclic acetal skeleton described above.

The polyester resin (A) used in the present embodiment contains, as the dicarboxylic acid unit, a unit derived from dicarboxylic acid having a naphthalene skeleton. Examples of the dicarboxylic acid unit having a naphthalene skeleton include, but not particularly limited to, the units derived from 1,3-naphthalenedicarboxylic acid, 1,4-naphthalene dicarboxylic acid, 1,5-naphthalene dicarboxylic acid, 2,6-naphthalene dicarboxylic acid, and 2,7-naphthalene dicarboxylic acid are preferable, and the unit derived from 2,6-naphthalene dicarboxylic acid is more preferable from the viewpoint of mechanical performance. The polyester resin (A) may contain one or two or more of the units derived from dicarboxylic acid having a naphthalene skeleton.

The ratio of the unit derived from dicarboxylic acid having a naphthalene skeleton in the dicarboxylic acid unit of the polyester resin (A) is preferably 1 to 100 mol %, more preferably 5 to 75 mol %, further preferably 10 to 55 mol %, and particularly preferably 15 to 45 mol %. When a ratio of the unit derived from dicarboxylic acid having a naphthalene skeleton is within the above range, a glass transition temperature of the polyester resin (A) increases and the polyester resin composition of the present embodiment is likely to have enhanced heat resistance, hence preferable.

From the viewpoint described above, the polyester resin (A) of the present embodiment, in which a ratio of the unit derived from diol having a cyclic acetal skeleton in the diol unit is 1 to 80 mol % and a ratio of the unit derived from dicarboxylic acid having a naphthalene skeleton in the dicarboxylic acid unit is 1 to 100 mol %, is particularly preferable.

The polyester resin (A) of the present embodiment may have a unit derived from dicarboxylic acid which does not have a naphthalene skeleton. Example of the unit derived from dicarboxylic acid which does not have a naphthalene skeleton include, but not particularly limited to, units derived from aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid, and pentacyclododecanedicarboxylic acid; aromatic dicarboxylic acid such as terephthalic acid, isophthalic acid, phthalic acid, 2-methylterephthalic acid, biphenyldicarboxylic acid, and tetralindicarboxylic acid. Of these, from viewpoints of thermal properties and mechanical properties of the polyester resin (A), the units derived from aromatic dicarboxylic acid are preferable, and the units derived from terephthalic acid and isophthalic acid are more preferable. The polyester resin (A) may contain one or two or more of the units derived from dicarboxylic acid which does not have a naphthalene skeleton.

The polyester resin (A) used in the present embodiments preferably contains, considering heat resistance, a unit derived from 3,9-bis(1,1-dimethyl-2-hydroxyethyl)2,4,8,10-tetraoxaspiro[5.5]undecane as the unit derived from diol having a cyclic acetal skeleton and a unit derived from 2,6-naphthalenedicarboxylic acid as the unit derived from dicarboxylic acid having a naphthalene skeleton. Further, considering the balance between economy and mechanical performance, the polyester resin (A) further preferably contains, in addition to the units described above, a unit derived from ethylene glycol as the unit derived from diol which does not have a cyclic acetal skeleton and a unit derived from terephthalic acid as the unit derived from dicarboxylic acid which does not have a naphthalene skeleton.

Further, a monoalcohol unit such as butyl alcohol, hexyl alcohol, or octyl alcohol, a polyhydric alcohol of trivalent or higher valent unit such as trimethylolpropane, glycerol, or pentaerythritol, a monocarboxylic acid unit such as benzoic acid, propionic acid, or butyric acid, or polycarboxylic acid of trivalent or higher valent unit such as trimellitic acid, trimesic acid, or pyromellitic acid, can also be introduced to the polyester resin (A) within the range in which the object of the present embodiments is not affected.

The method for producing the polyester resin (A) is not limited, and a method conventionally known can be suitably used. Examples thereof include melt polymerization methods such as transesterification and direct esterification, solution polymerization method and solid phase polymerization. A conventionally known transesterification catalyst, an esterification catalyst, a polycondensation catalyst, an esterification inhibitor, various stabilizers such as a heat stabilizer and a light stabilizer, and a polymerization regulator used when producing the polyester resin (A) can also be used.

Specific Examples of the transesterification catalyst, esterification catalyst, and polycondensation catalyst include, but not limited thereto, metal compounds such as zinc, lead, cerium, cadmium, manganese, cobalt, lithium, sodium, potassium, calcium, nickel, magnesium, vanadium, aluminum, titanium, antimony, germanium, and tin (e.g., fatty acid salts, carbonate, phosphate, hydroxides, chlorides, oxides, alkoxide) and magnesium metal. These can be used singly, or two or more can be used in combination. For the catalyst, the compounds of manganese, cobalt, zinc, titanium, calcium, antimony, and germanium of the above are preferable, the compounds of manganese, antimony, titanium, and germanium are more preferable, and manganese acetate, antimony trioxide, titanium tetrabutoxide, and germanium dioxide are further preferable. The amount of these catalysts used is not limited but, in term of the metal component amount to the polyester resin, is preferably 1 to 1000 ppm, more preferably 3 to 500 ppm, further preferably 5 to 250 ppm, and particularly preferably 7 to 100 ppm.

Examples of the heat stabilizer include, but not particularly limited to, phosphorus compounds such as phosphoric acid, phosphorous acid, phosphate, and phosphite. Of these, phosphoric acid esters such as trimethyl phosphate and triethyl phosphate are preferable. The amount of these heat stabilizers used is not limited but, in term of the phosphorus atom to the polyester resin, is preferably 1 to 300 ppm, more preferably 5 to 100 ppm, and further preferably 10 to 60 ppm.

In the present embodiments, the intrinsic viscosity of the polyester resin (A) is preferably adjusted from the viewpoints of assuring the physical properties such as sufficient mechanical strength and sufficient moldability. The intrinsic viscosity is preferably a value within the range of 0.4 to 1.5 dl/g, more preferably 0.5 to 1.0 dl/g, and further preferably 0.5 to 0.9 dl/g, the value being measured, for example, using a mixed solvent (weight ratio: phenol/1,1,2,2-tetraachloroethane=6/4) at a constant temperature of 25° C. by a Ubbelohde viscometer. When a intrinsic viscosity exceeds the above 0.4 dl/g, the strength properties of a molded product tend to be better and when a intrinsic viscosity is the above 1.5 dl/g or less, better moldability is likely to be achieved.

Next, the polyester resin (B) not having a cyclic acetal skeleton used in the present embodiments is described. Examples of the unit derived from diol which does not have a cyclic acetal skeleton composing the polyester resin (B) include, but not particularly limited to, diol-derived units such as aliphatic diols such as ethylene glycol, trimethylene glycol, 1,4-butanediol, 1,5-pentanediol, 1,6-hexanediol, diethylene glycol, propylene glycol, and neopentyl glycol; cyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornane dimethanol, tricyclodecane dimethanol, and pentacyclododecane dimethanol; ether compounds such as polyethylene glycol, polypropylene glycol, and polybutylene glycol; bisphenols such as 4,4'-(1-methylethylidene)bisphenol, methylene bisphenol (bisphenol F), 4,4'-cyclohexylidenebisphenol (bisphenol Z), and 4,4'-sulfonylbisphenol (bisphenol S); alkylene oxide adducts of the above bisphenols; aromatic dihydroxy compounds such as hydroquinone, resorcin, 4,4'-dihydroxybiphenyl, 4,4'-dihydroxydiphenyl ether, and 4,4'-dihydroxydiphenylbenzophenone; and alkylene oxide adducts of the above aromatic dihydroxy compounds. The polyester resin (B) is not limited but, from viewpoints of heat resistance, transparency, mechanical performance, fabricability of the polyester resin composition (C), is preferably the aromatic polyester resin composed of the dicarboxylic acid unit derived from at least one aromatic dicarboxylic acid selected from terephthalic acid, isophthalic acid, 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid and the diol unit derived from at least one diol selected from ethylene glycol, trimethylene glycol, 1,4-butanediol, 1,4-cyclohexanedimethanol, and bisphenol A. Of these, from viewpoints of heat resistance, mechanical performance, fabricability and transparency, PET, polybutylene terephthalate, polyethylene (2,6-)naphthalate, polyethylene terephthalate-isophthalate are preferable, and particularly considering fabricability, transparency and economy, PET is more preferable.

The polyester resin composition (C) of the present embodiment can be obtained by melt-kneading the above polyester resin (A) and the polyester resin (B), and one or more of each of the polyester resins (A) and (B) may be used as long as the requirements of the present embodiments (1) to (2) described above are satisfied. The refractive index difference of the polyester resin (A) and the polyester resin (B), measured with sodium D radiation as a light source, must be 0.005 or less, preferably 0.004 or less, and more preferably 0.003 or less. The above refractive index can be measured, more specifically, by the method described in Examples to be illustrated later. The refractive index of the polyester resin (A) can be adjusted by changing the kind and ratio of the constitutional units. For example, when a ratio of the unit derived from diol having a cyclic acetal skeleton is increased, a refractive index of the polyester resin (A) is likely to reduce, whereas when the dicarboxylic acid unit having a naphthalene skeleton is is likely to increase. When a refractive index difference between the polyester resin (A) and the polyester resin (B) is within the above range, the polyester resin composition (C) has excellent transparency. The refractive index of the polyester resin (A) may be higher or lower than the polyester resin (B).

For example, when the polyester resin (B) is PET with the refractive index thereof being about 1.575, the refractive index of the polyester resin (A) must be 1.570 to 1.580 for obtaining the polyester resin composition (C) with excellent transparency. There are many compositions which provide the polyester resin (A) having such a refractive index range, however, when the mechanical properties, heat resistance and economy of the polyester resin (A) are considered, diol other than the diol having a cyclic acetal skeleton is preferably ethylene glycol and dicarboxylic acid other than the dicarboxylic acid having a naphthalene skeleton is preferably terephthalic acid. Also, the content of the unit derived from diol having a cyclic acetal skeleton is preferably 8 to 25 mol %, and the content of the unit derived from dicarboxylic acid having a naphthalene skeleton is preferably 15 to 45 mol %.

Further, when the unit derived from diol having a cyclic acetal skeleton is 3,9-bis(1,1-dimethyl-2-hydroxyethyl)2,4,8,10-tetraoxaspiro[5.5]undecane (hereinafter sometimes referred to as "SPG") and when the unit derived from dicarboxylic acid having a naphthalene skeleton is 2,6-naphthalenedicarboxylic acid in the polyester resin (A), the molar ratio of the unit derived from SPG to the unit derived from 2,6-naphthalenedicarboxylic acid in the polyester resin (A) is preferably 0.2 to 2.5, more preferably 0.3 to 1.2, and further preferably 0.4 to 0.8.

In the polyester resin composition (C) of the present embodiments, the glass transition temperature difference between the polyester resin (A) and the polyester resin (B) is 35° C. or less. The glass transition temperature as referred in the present embodiments means the temperature when a half-change of the difference of the base lines between before and after the transition of the DSC curve obtained using a differential scanning calorimeter was observed. More specifically, the glass transition temperature can be measured by the method described in Examples to be illustrated later. When a glass transition temperature difference between the polyester resin (A) and the polyester resin (B) exceeds 35° C., the transparency of the polyester resin composition (C), when stretched to produce a secondary processed molded article, is impaired. From the above viewpoint, the glass transition temperature difference between the polyester resin (A) and the polyester resin (B) is preferably 32° C. or less, more preferably 30° C. or less, further preferably 29° C. or less, and further more preferably 25° C. or less.

From the viewpoint of imparting heat resistance to the polyester resin (B), the glass transition temperature of polyester resin (A) is preferably higher, the glass transition temperature of polyester resin (A) is more preferably 5° C. or higher, further preferably 10° C. or higher, and particularly preferably 15° C. or higher, than the glass transition temperature of polyester resin (B).

Also, from the viewpoint of the compatibility in imparting the transparency and heat resistance after stretching, the glass transition temperature of polyester resin (A) is preferably 1 to 35° C. higher, more preferably 5 to 32° C. higher, further preferably 5 to 30° C. higher, further more preferably 10 to 29° C., and particularly preferably 10 to 25° C. higher, than the glass transition temperature of polyester resin (B).

The mixing ratio of the polyester resin (A) and the polyester resin (B) in the polyester resin composition (C) of the present embodiments is suitably variable depending on physical properties and purpose of use, but the mixing ratio is preferably adjusted such that the ratio of the diol unit having a cyclic acetal skeleton in the entire diol constitutional unit in the polyester resin composition (C) is 0.05 to 2.0 mol %, more preferably 0.1 to 1.5 mol %, and further preferably 0.2 to 1.0 mol %. When a ratio of the diol unit having a cyclic acetal skeleton in the entire diol constitutional unit in the polyester resin composition (C) is within the above range, better heat resistance is likely to be imparted to the polyester resin composition (C).

Also, the mixing ratio is preferably adjusted such that the ratio of the dicarboxylic acid unit having a naphthalene skeleton in the entire dicarboxylic acid constitutional unit in the polyester resin composition (C) is 0.1 to 3.0 mol %, more preferably 0.3 to 2.5 mol %, and further preferably 0.5 to 2.0 mol %. When a ratio of the dicarboxylic acid unit having a naphthalene skeleton in the entire dicarboxylic acid constitutional unit in the polyester resin composition (C) is within the above range, better heat resistance and UV barrier properties are likely to be imparted to the polyester resin composition (C).

From the viewpoint described above, the polyester resin composition (C), in which a ratio of the unit derived from diol having a cyclic acetal skeleton in the entire diol constitutional unit is 0.05 to 2.0 mol % and a ratio of the unit derived from dicarboxylic acid having a naphthalene skeleton in the entire dicarboxylic acid unit is 0.1 to 3.0 mol %, is particularly preferable. Note that the composition of each constitution component in the present embodiments described above can be confirmed by the method described in Examples to be illustrated later.

The stretching as referred in the present embodiments means the molding method by which the polyester resin composition (C) is extended at a temperature higher than the glass transition temperature and a lower than the melting temperature of the polyester resin composition (C). The stretching method is not limited and a conventionally known method can be employed. Examples thereof may include hot-parison injection blow molding, cold-parison injection blow molding, extrusion blow molding, uniaxial stretching molding, simultaneous biaxial stretching molding, sequential biaxial stretching molding, inflation molding, vacuum molding, pressure molding, and vacuum pressure molding.

The polyester secondary processed molded article (D) of the present embodiment can be obtained by stretching the polyester resin composition (C) of the present embodiment. More specifically, the polyester secondary processed molded article (D) of the present embodiment is a molded article molded by the method described above, and examples thereof include, but not limited thereto, single-layer or multilayer hollow molded articles, single-layer or multilayer films, and single-layer or multilayer sheet molded articles.

The temperature at which the polyester resin composition (C) of the present embodiment is stretched is not limited, and may be suitably adjusted in accordance with the glass transition temperature of polyester resin composition (C), the stretching method, the desired shape of polyester secondary processed molded article, and the like. For example, the temperature, based on the glass transition temperature of polyester resin composition (C), is preferably +0 to +80° C., more preferably +5 to +60° C., and further preferably +10 to +40° C.

The draw ratio when stretching the polyester resin composition (C) of the present embodiment is not limited and may be suitably adjusted depending on the shape, and the like, of the intended secondary processed molded article.

The polyester secondary processed molded article (D) of the present embodiment has a haze value of 5%/20 µm or less, the haze value being measured in accordance with JIS-K-7105. The above haze value is preferably 3%/20 µm or less, further preferably 2%/20 µm or less, and particularly preferably 1%/20 µm or less. When the above haze value is within the above range, better transparency is likely to be imparted to the polyester secondary processed molded article (D) of the present embodiment subjected to fabrication involving stretching. The above haze value can be measured specifically by the method described in Examples to be illustrated later.

The polyester resin composition (C) of the present embodiment has a light transmittance at a wavelength of 350 nm is 30%/200 µm or less. The transmittance is more preferably 20%/200 µm or less, further preferably 15%/200 µm or less, and particularly preferably 10%/200 µm or less. When the polyester resin composition (C) has a light transmittance at a wavelength of 350 nm is within the above range, better UV barrier properties are likely to be imparted to the polyester resin composition (C) of the present embodiment.

The polyester resin composition (C) of the present embodiment can contain various molding auxiliary agents and additives within the range in which the object of the present embodiment is not adversely affected. Examples of the molding auxiliary agents and additives include, but not particularly limited to, a filler, a colorant, a reinforcer, a surface smoothing agent, a leveling agent, a curing reaction promoter, a light stabilizer, a UV absorber, a plasticizer, an antioxidant, an extender, a delustering agent, a dry modifier, an antistatic agent, a sedimentation inhibitor, a surfactant, a flow improvement agent, a drying oil, waxes, and a thermoplastic oligomer.

The polyester resin composition (C) of the present embodiment can contain a solvent within the range in which the object of the present embodiment is not adversely affected, and may also contain a single or a plurality of resins such as aliphatic polyester resins, thermoplastic polyester elastomers, polyolefines, polystyrenes, acrylonitrile-butadiene-styrene copolymers, polymethylmethacrylates, polysulfones, polyethers, phenoxy resins, and polyphenylene oxides.

The polyester resin composition (C) of the present embodiments can be obtained by, for example, melt-kneading, the polyester resin (A) and the polyester resin (B). The melt-kneading may be carried out by a conventionally known method and examples thereof include a method in which the polyester resin (A) and the polyester resin (B) are mixed in advance and melt-kneaded using a uniaxial extruder, biaxial extruder, or injection molding machine. A known apparatus can be used for mixing the resins and examples thereof include a tumbler, a high speed mixer, a nauta mixer, a ribbon blender, and an intensive mixer.

When the polyester resin (A) and the polyester resin (B) are melt-kneaded, a partial transesterification reaction may be caused between the polyester resins, but the advantageous effects of the present embodiment are not adversely affected by the presence of the transesterification reaction or the degree of the transesterification reaction, and thus the resin composition in which the transesterification reaction is caused also belongs to the polyester resin composition of the present embodiment.

When the polyester resin composition (C) of the present embodiment, with the polyester resin (B) being PET, has excellent transparency, it is industrially very useful, hence preferable. In other words, the polyester resin composition obtained by melt-kneading the polyester resin (A) and PET has enhanced heat resistance and UV barrier properties while maintaining good transparency, hence preferable. In addition, the polyester resin composition (C) of the present embodiment has excellent transparency even when stretched and thus can be preferably used not only for an injection molded article and a single-layer or multilayer sheets but also for films obtained by stretching these sheets, sheet molded articles, hollow containers obtained by injection blow molding or extrusion blow molding.

Examples of specific usage of the polyester resin composition (C) of the present embodiment include, but not particularly limited to, hollow containers for drinking water, carbonated beverage, coffee beverage, green tee beverage, English tea beverage, carbonated juice with fruit juices, sports drink, lactic acid beverage, wine, beer, distilled liquor, rice wine, soy sauce, sauce, dressing, nutritional supplement drink, hand cream, hairdressing, eye drop, cosmetics, shampoo, body soap, pharmaceutical product, stationery, tool, aromatic, and deodorizer; collapsible tubes for mustard paste, horseradish paste, ginger paste, garlic paste, condensed milk, peanut butter, margarine, chocolate cream, and toothpaste; outer wrapping films for PET bottle, cheese, ham, and sausage; UV-cut films for window glass; packaging containers for jelly, pudding, cut fruits, soybean paste, toothbrush, electric appliances, semiconductor, and baby food.

EXAMPLES

Hereinafter, the present embodiment is described in further detail with reference to Examples, but the scope of the present embodiment is not limited to these Examples.

[Synthesis of the Polyester Resin (A) (Production Examples 1, 2 and 3)]

A 0.15 $m^3$ polyester manufacturing apparatus, equipped with a packed bed fractionating column, a partial condenser, a total condenser, a cold trap, a stirrer, a heating apparatus, and a nitrogen introduction tube, was charged with the starting material monomers in the amounts described in Table 1, and the transesterification reaction was carried out in the presence of 0.03 mol of manganese acetate tetrahydrate to 100 mol of the dicarboxylic acid component under nitrogen atmosphere at an elevated temperature of 215° C. After the amount of methanol distillate reached 90% or more of the theoretical amount, 0.01 mol of antimony oxide (III) and 0.06 mol of triethyl phosphate were added to 100 mol of the dicarboxylic acid component, the temperature raising and pressure reduction were slowly carried out, and the polymerization was carried out at a final temperature of 280° C. and 100 Pa or less. The reaction was completed at the time of achieving a suitable melt viscosity, thereby obtaining the polyester resin (A). The evaluation results of the obtained polyester resin (A) are shown in Table 1.

Note that the abbreviations in the table mean as follows.

DMT: Dimethyl terephthalate

NDCM: 2,6-Dimethyl naphthalene dicarboxylate

EG: Ethylene glycol

SPG: 3,9-bis(1,1-dimethyl-2-hydroxyethyl)-2,4,8,10-tetraoxaspiro[5.5]undecane

[Other Polyester Resins]

The polyester resins not having a cyclic acetal skeleton used in the present Examples are described below. The evaluation results of these polyester resins are also shown in Table 2.

(1) PET: Polyethylene terephthalate (product of Nippon Unipet Co., Ltd., tradename: UNIPET RT553C)

(2) PEN: Polyethylene naphthalate (product of TOYOBO Co., Ltd., tradename: PN-510)

[Evaluation Method for Each Polyester Resin]

(1) Copolymerization Composition

The composition of each constitutional unit was calculated by the $^1$H-NMR measurement. The measurement was carried out at 500 MHz using a BRUKER'S BRUKER ADVANCE-500 III. Deuterated chloroform was used as the solvent. For evaluating PET and PEN, a deuterated chloroform/deuterotrifluoroacetic acid mixed solvent (volume ratio: 9/1) was used.

(2) Glass Transition Temperature

Using DSC/TA-60WS produced by Shimadzu Corporation, approximately 10 mg of a polyester resin was placed in an aluminum unsealed container and heated to 280° C. at a temperature rising rate of 20° C./min in a nitrogen gas (30 mL/min) stream, and the melted resin was abruptly cooled to prepare a measurement sample. The measurement sample was heated again to 280° C. at a temperature rising rate of 20° C./min in a nitrogen gas (30 mL/min) stream to carry out the measurement, and the temperature, when a half-change of the difference of the base lines between before and after the transition of the DSC curve was observed, was defined as the glass transition temperature.

(3) Intrinsic Viscosity

The measurement was carried out at 25° C. using a mixed solvent (weight ratio: phenol/1,1,2,2-tetrachloroethane=6/4). The measurement was carried out using VISCOTEK's RELATIVE VISCOMETER Y501C.

(4) Refractive Index

A polyester resin was molded into an isosceles right triangle (length of each side: 20 mm; thickness: 3 mm) by injection molding. The injection molding was carried out using SE130 produced by Sumitomo Heavy Industries, Ltd. The resins of Production Examples 1 to 3 were molded under the conditions of a cylinder temperature of 230 to 245° C., an injection speed of 20 mm/min, and a mold temperature of 35° C. PET and PEN were molded under the same conditions with the exception that a cylinder temperature was changed to 230 to 280° C. The obtained molded piece subjected to annealing treatment in an oven at Tg-20° C. for 10 hours was used as a measurement sample and the refractive index was measured using a refractive index meter produced by ATAGO Co., Ltd. at 589 nm (sodium D radiation).

TABLE 1

|  |  | Production Example 1 | Production Example 2 | Production Example 3 |
|---|---|---|---|---|
| Synthesis of polyester resin (A) Amount of monomer charged (mol) | | | | |
| Dicarboxylic acid component | NDCM | 62.2 | 103.5 | 79.9 |
| | DMT | 186.7 | 103.5 | 148.3 |
| Diol component | SPG | 37.3 | 62.1 | 50.2 |
| | EG | 410.8 | 310.5 | 360.5 |
| Evaluation result of polyester resin (A) | | | | |
| Copolymer composition (mol %) | NDCM | 25 | 50 | 35 |
| | SPG | 15 | 30 | 22 |
| Tg (° C.) | | 105 | 120 | 111 |
| Intrinsic viscosity (dl/g) | | 0.68 | 0.67 | 0.68 |
| Refractive index (nd) | | 1.575 | 1.576 | 1.575 |

TABLE 2

| Other polyester resins | | PET | PEN |
|---|---|---|---|
| Copolymer composition (mol %) | NDCM | 0 | 100 |
| | DMT | 100 | 0 |
| | EG | 100 | 100 |
| Tg (° C.) | | 84 | 124 |
| Intrinsic viscosity (dl/g) | | 0.80 | 0.67 |
| Refractive index (nd) | | 1.575 | 1.646 |

Example 1

The polyester resin synthesized in Production Example 1 was used as the polyester resin (A) and the PET resin shown in Table 2 as the polyester resin (B). The polyester resin (A) and the polyester resin (B) were dry-blended in a tumbler in the ratios shown in Table 3. Then, the blend was melt-kneaded using a uniaxial extruder (screw diameter: 32 mmϕ, L/D: 32) to produce a 0.2 mm thickness polyester resin composition (C) as a sheet. The film production conditions were a cylinder temperature of 235 to 265° C., a T-die temperature of 265° C., the number of screw rotation of 40 rpm, and a cooling roll temperature of 75° C. Various evaluation was carried out by the method described below.

The obtained sheet of the polyester resin composition (C) was biaxially stretched simultaneously to 3.0×3.0 times at the temperatures shown in table 3, with a preheating temperature for 30 seconds to obtain the polyester secondary processed molded article (D), and the haze value thereof was measured. The stretching was carried out using a biaxial stretching machine EX10-5S produced by TOYO SEIKI Co., Ltd. The evaluation results of the resin composition (C) and the secondary processed molded article (D) are shown in Table 3.

[Evaluation Method of the Sheet Obtained from the Polyester Resin Composition (C)]

(1) Composition

The composition of each constitutional unit was calculated by the $^1$H-NMR measurement. The measurement was carried out at 500 MHz using a BROKER'S BROKER ADVANCE-500 III. A deuterated chloroform/deuterotrifluoroacetic acid mixed solvent (volume ratio: 9/1) was used as the solvent.

(2) Glass Transition Temperature

Using DSC/TA-60WS produced by Shimadzu Corporation, approximately 10 mg of the polyester resin composition sheet was placed in an aluminum unsealed container and heated to 280° C. at a temperature rising rate of 20° C./min in a nitrogen gas (30 mL/min) stream, and the melted resin was abruptly cooled to prepare a measurement sample. The sample was measured under the same conditions, and the temperature, when a half-change of the difference of the base lines between before and after the transition of the DSC curve was observed, was defined as the glass transition temperature.

(3) Haze Value

The haze value of the 0.2 mm thickness sheet was measured in accordance with JIS K-7105, ASTM D1003. The measurement apparatus used was a haze value measuring apparatus (model type: COH-300A) produced by NIPPON DENSHOKU INDUSTRIES Co., Ltd.

(4) Light Transmittance at a Wavelength of 350 nm

For the light transmittance at a wavelength of 350 nm, a 0.2 mm thickness sheet was measured using a UV-VIS-NIR spectrophotometer UV-3100PC and a Multi-Purpose Large-Sample Compartment MPC-3100 model, produced by Shimadzu Corporation.

[Evaluation of Polyester Secondary Processed Molded Article (D)]

(5) Haze Value

For the haze value, a 0.2 mm thickness film was measured in accordance with JIS K-7105, ASTM D1003. The measurement apparatus used was a haze value measuring apparatus (model type: COH-300A) produced by NIPPON DENSHOKU INDUSTRIES Co., Ltd.

Examples 2 to 3

The polyester resin composition (C) as a sheet and the biaxially stretched polyester secondary processed molded article (D) were produced in the same manner as in Example 1, with the exception that the melt-kneading ratio of the polyester resin (A) and the polyester resin (B) in Example 1 was changed to the ratio shown in Table 3, and various evaluation was carried out. The evaluation results of the resin composition (C) and the secondary processed molded article (D) are shown in Table 3.

Examples 4 and 5

The polyester resin composition (C) as a sheet and the biaxially stretched polyester secondary processed molded article (D) were produced in the same manner as in Example 1, with the exception that, in Example 1, the polyester resin synthesized in Production Example 3 was used as the polyester resin (A), the melt-kneading ratio of the polyester resin (A) and the polyester resin (B) and the stretching temperature of the polyester resin (C) sheet were changed to the values shown in Table 4. The evaluation results of the resin composition (C) and the secondary processed molded article (D) are shown in Table 4.

Comparative Examples 1 to 3

The polyester resin composition (C) as a sheet and the biaxially stretched polyester secondary processed molded article (D) were produced in the same manner as in Example 1, with the exception that, in Example 1, the polyester resin synthesized in Production Example 2 was used as the polyester resin (A), the melt-kneading ratio of the polyester resin (A) and the polyester resin (B), and the stretching temperature of the polyester resin (C) sheet were changed to the values shown in Table 5, and various evaluation was carried out. The evaluation results of the resin composition (C) and the secondary processed molded article (D) are shown in Table 5.

Comparative Examples 4 to 6

Using the PEN resin in place of the polyester resin (A) and the PET resin shown in Table 2 as the polyester resin (B), PEN and the polyester resin (B) were dry-blended in a tumbler in the ratio shown in Table 6, and subsequently the blend was melt-kneaded using a uniaxial extruder (screw diameter: 32 mmφ, L/D: 32) to produce a 0.2 mm thickness polyester resin composition (C) as a sheet. The film production conditions were a cylinder temperature of 235 to 285° C., a T-die temperature of 285° C., the number of screw rotation of 40 rpm, and a cooling roll temperature of 75° C. Various evaluation was carried out by the method described below.

The obtained sheet of the polyester resin composition (C) was biaxially stretched simultaneously to 3.0×3.0 times at the temperatures shown in Table 6, with a preheating temperature for 30 seconds, to obtain the polyester secondary processed molded article (D), and the various evaluations were carried out. The evaluation results of the resin composition (C) and the secondary processed molded article (D) are shown in Table 6.

TABLE 3

|  | Example 1 | Example 2 | Example 3 |
|---|---|---|---|
| Polyester resin (A) | Production Example 1 | Production Example 1 | Production Example 1 |
| Polyester resin (B) | PET | PET | PET |
| Refractive index difference | 0.000 | 0.000 | 0.000 |
| Glass transition temperature difference (° C.) | 21 | 21 | 21 |
| Melt-kneading ratio (wt %) | | | |
| Polyester resin (A) | 1 | 3 | 7 |
| Polyester resin (B) | 99 | 97 | 93 |
| Evaluation of polyester resin composition (C) | | | |
| Composition    SPG (mol %) | 0.1 | 0.4 | 0.9 |
|                NDCM (mol %) | 0.2 | 0.6 | 1.4 |
| Glass transition temperature (° C.) | 85 | 85 | 85 |
| Light transmittance at a wavelength of 350 nm (%) | 20 | 8 | 6 |
| Haze value (%) | 0.2 | 0.2 | 0.3 |
| Stretching of polyester resin composition (C) | | | |
| Stretching temperature (° C.) | 100 | 100 | 100 |
| Evaluation of polyester secondary processed molded article (D) | | | |
| Haze value (%) | 0.1 | 0.1 | 0.1 |

TABLE 4

|  | Example 4 | Example 5 |
|---|---|---|
| Polyester resin (A) | Production Example 3 | Production Example 3 |
| Polyester resin (B) | PET | PET |
| Refractive index difference | 0.000 | 0.000 |
| Glass transition temperature difference (° C.) | 27 | 27 |
| Melt-kneading ratio (wt %) | | |
| Polyester resin (A) | 5 | 10 |
| Polyester resin (B) | 95 | 90 |

TABLE 4-continued

|  | | Example 4 | Example 5 |
|---|---|---|---|
| Evaluation of polyester resin composition (C) | | | |
| Composition | SPG (mol %) | 0.8 | 1.7 |
|  | NDCM (mol %) | 1.3 | 2.6 |
| Glass transition temperature (° C.) | | 85 | 86 |
| Light transmittance at a wavelength of 350 nm (%) | | 7 | 5 |
| Haze value (%) | | 0.4 | 0.7 |
| Stretching of polyester resin composition (C) | | | |
| Stretching temperature (° C.) | | 105 | 105 |
| Evaluation of polyester secondary processed molded article (D) | | | |
| Haze value (%) | | 0.3 | 0.6 |

TABLE 5

|  | Comparative Example 1 | Comparative Example 2 | Comparative Example 3 |
|---|---|---|---|
| Polyester resin (A) | Production Example 2 | Production Example 2 | Production Example 2 |
| Polyester resin (B) | PET | PET | PET |
| Refractive index difference | 0.001 | 0.001 | 0.001 |
| Glass transition temperature difference (° C.) | 36 | 36 | 36 |
| Melt-kneading ratio (wt %) | | | |
| Polyester resin (A) | 1 | 3 | 5 |
| Polyester resin (B) | 99 | 97 | 95 |
| Evaluation of polyester resin composition (C) | | | |
| Composition SPG (mol %) | 0.2 | 0.6 | 1.0 |
| NDCM (mol %) | 0.3 | 1.0 | 1.7 |
| Glass transition temperature (° C.) | 85 | 85 | 85 |
| Light transmittance at a wavelength of 350 nm (%) | 9 | 6 | 5 |
| Haze value (%) | 0.3 | 0.6 | 1.1 |
| Stretching of polyester resin composition (C) | | | |
| Stretching temperature (° C.) | 130 | 120 | 150 |
| Evaluation of polyester secondary processed molded article (D) | | | |
| Haze value (%) | 20.0 | 36.0 | 57.5 |

TABLE 6

|  | Comparative Example 4 | Comparative Example 5 | Comparative Example 6 |
|---|---|---|---|
| Polyester resin | PEN | PEN | PEN |
| Polyester resin (B) | PET | PET | PET |
| Refractive index difference | 0.071 | 0.071 | 0.071 |
| Glass transition temperature difference (° C.) | 40 | 40 | 40 |
| Melt-kneading ratio (wt %) | | | |
| Polyester resin | 1 | 2 | 3 |
| Polyester resin (B) | 99 | 98 | 97 |
| Evaluation of polyester resin composition (C) | | | |
| Composition SPG (mol %) | 0.0 | 0.0 | 0.0 |
| NDCM (mol %) | 0.8 | 1.6 | 2.4 |
| Glass transition temperature (° C.) | 86 | 86 | 86 |
| Light transmittance at a wavelength of 350 nm (%) | 11 | 15 | 16 |
| Haze value (%) | 27.4 | 51.7 | 53.5 |
| Stretching of polyester resin composition (C) | | | |
| Stretching temperature (° C.) | 130 | 120 | 150 |
| Evaluation of polyester secondary processed molded article (D) | | | |
| Haze value (%) | 24.0 | 32.1 | 41.0 |

This application is based on the Japanese patent application (Patent Application No. 2013-162022), filed on Aug. 5, 2013; and the disclosure of which is incorporated by reference herein.

INDUSTRIAL APPLICABILITY

The polyester resin composition of the present invention has excellent heat resistance, transparency, UV barrier properties and exhibits excellent transparency even after stretched, thus being suitably applicable to sheets, films, sheet molded articles, and hollow containers.

The invention claimed is:

1. A polyester resin composition comprising:
a polyester resin (A) comprising, as a diol unit, a unit derived from diol having a cyclic acetal skeleton, and as a dicarboxylic acid unit, a unit derived from dicarboxylic acid having a naphthalene skeleton, wherein the unit derived from dicarboxylic acid having a naphthalene skeleton is present in an amount of less than 70 mol %; and
a polyester resin (B) not having a cyclic acetal skeleton, and
wherein the polyester resin composition satisfies following (1) and (2)
(1) a refractive index difference between the polyester resin (A) and the polyester resin (B) is 0.005 or less, the refractive index being measured with sodium D radiation as a light source;
(2) a glass transition temperature difference between the polyester resin (A) and the polyester resin (B) is 35° C. or less.

2. The polyester resin composition according to claim 1, wherein, in the polyester resin (A), the unit derived from diol having a cyclic acetal skeleton in the diol unit is present in an amount of 1 to 80 mol %.

3. The polyester resin composition according to claim 1, wherein, in the polyester resin composition, the unit derived from diol having a cyclic acetal skeleton is 0.05 to 2.0 mol % of all diol units, and the unit derived from dicarboxylic acid having a naphthalene skeleton is 0.1 to 3.0 mol % of all dicarboxylic acid units.

4. The polyester resin composition according to claim 1, wherein the unit derived from diol having a cyclic acetal skeleton in the polyester resin (A) is a unit derived from diol represented by formula (1) or formula (2):

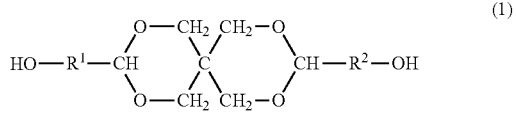

wherein R¹ and R² are, each independently, a divalent hydrocarbon group selected from the group consisting of aliphatic hydrocarbon groups having 1 to 10 carbon atoms, cycloaliphatic hydrocarbon groups having 3 to 10 carbon atoms, and aromatic hydrocarbon groups having 6 to 10 carbon atoms;

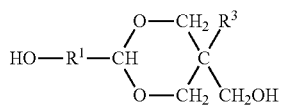

(2)

wherein R¹ is the same as defined above, and R³ is a divalent hydrocarbon group selected from the group consisting of aliphatic hydrocarbon groups having 1 to 10 carbon atoms, cycloaliphatic hydrocarbon groups having 3 to 10 carbon atoms, and aromatic hydrocarbon groups having 6 to 10 carbon atoms.

5. The polyester resin composition according to claim 1, wherein the unit derived from diol having a cyclic acetal skeleton in the polyester resin (A) is a unit derived from 3,9-bis(1,1-dimethyl-2-hydroxyethyl)-2,4,8,10-tetraoxaspiro[5.5]undecane, or 5-methylol-5-ethyl-2-(1,1-dimethyl-2-hydroxyethyl)-1,3-dioxane.

6. The polyester resin composition according to claim 1, wherein the unit derived from dicarboxylic acid having a naphthalene skeleton in the polyester resin (A) is a unit derived from at least one dicarboxylic acid selected from the group consisting of 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid.

7. The polyester resin composition according to claim 1, wherein the unit derived from dicarboxylic acid having a naphthalene skeleton in the polyester resin (A) is a unit derived from 2,6-naphthalenedicarboxylic acid.

8. The polyester resin composition according to claim 1, wherein the polyester resin (B) is polyethylene terephthalate.

9. The polyester resin composition according to claim 1, wherein a light transmittance at a wavelength of 350 nm is 30%/200 μm or less.

10. A polyester secondary processed molded article obtained by stretching the polyester resin composition according to claim 1.

11. The polyester secondary processed molded article according to claim 10, which has a haze value of 5%/20 μm or less, the haze value being measured in accordance with JIS-K-7105.

12. The polyester resin composition according to claim 1, wherein, in the polyester resin (A), the unit derived from dicarboxylic acid having a naphthalene skeleton in the dicarboxylic acid unit is present in an amount of 10 to 55 mol %.

13. The polyester resin composition according to claim 12, wherein, in the polyester resin (A), the unit derived from dicarboxylic acid having a naphthalene skeleton in the dicarboxylic acid unit is present in an amount of 15 to 45 mol %.

* * * * *